(12) United States Patent
Schooley et al.

(10) Patent No.: US 8,498,572 B1
(45) Date of Patent: Jul. 30, 2013

(54) HOME AUTOMATION DEVICE PAIRING BY NFC-ENABLED PORTABLE DEVICE

(75) Inventors: Stephen Schooley, Menlo Park, CA (US); Paul Heninwolf, San Carlos, CA (US); Christopher Jones, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/593,727

(22) Filed: Aug. 24, 2012

(51) Int. Cl.
*H04B 5/00* (2006.01)

(52) U.S. Cl.
USPC ......... 455/41.1; 455/41.2; 455/90.1; 340/5.8; 340/10.51

(58) Field of Classification Search
USPC ................ 455/41.1, 41.2, 90.1, 550.1, 552.1, 455/553.1; 340/5.8, 10.51
See application file for complete search history.

(56) References Cited

U.S. PATENT DOCUMENTS

| 7,403,838 | B2 * | 7/2008 | Deen et al. | 700/276 |
| 2011/0210820 | A1 * | 9/2011 | Talty et al. | 340/5.8 |
| 2012/0093141 | A1 * | 4/2012 | Imes et al. | 370/338 |

FOREIGN PATENT DOCUMENTS

EP 2015274 A1 1/2009

* cited by examiner

*Primary Examiner* — Tuan H Nguyen
(74) *Attorney, Agent, or Firm* — Morris & Kamlay LLP

(57) ABSTRACT

A method and device are disclosed that may include collecting information from a radio frequency readable tag of a first electrical device using a radio frequency tag reader in a portable device. A control application may be launched on the portable device in response to the collected information. A graphical user interface may be presented on the portable device display. Control parameters may be set for the first electrical device in response to inputs to the graphical user interface.

21 Claims, 3 Drawing Sheets

HOME AUTOMATION DEVICE PAIRING BY NFC-ENABLED PORTABLE DEVICE

BACKGROUND

NFC tags are passive information devices that respond to the energy applied to the tag by an NFC reader. The NFC tag may provide some information processing functionality and may provide information to the NFC reader. The effective range of an NFC reader is limited to approximately ten of centimeters. Near Field Communication (NFC) readers within portable devices are becoming more prevalent.

BRIEF SUMMARY

According to an implementation of the disclosed subject matter, a method is disclosed that may include collecting information from a radio frequency readable tag of a first electrical device using a radio frequency tag reader in a portable device. A control application may be launched on the portable device in response to the collected information. A graphical user interface may be presented on the portable device display. Control parameters may be set for the first electrical device in response to inputs to the graphical user interface.

According to a further implementation of the disclosed subject matter, the disclosed method may include selecting, in the graphical user interface, at least one control parameter from a plurality of control parameters presented in the graphical user interface for controlling the first electrical device. Second data may be received from a NFC tag associated with a second electrical device. The second data may provide information related to the second electrical device. Functions that pair the first electrical device to the second electrical device may be set.

According to an implementation of the disclosed subject matter, a device is disclosed that may include a memory, a NFC tag reader, a display device, a transceiver and a processor. The processor may be configured to collect information from a radio frequency readable tag of a first electrical device using a radio frequency tag reader in a portable device. The processor may cause a control application to be launched on the portable device in response to the collected information. A graphical user interface may be presented on the display device by the processor. The processor may set control parameters for the first electrical device in response to inputs to the graphical user interface presented on the display device.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
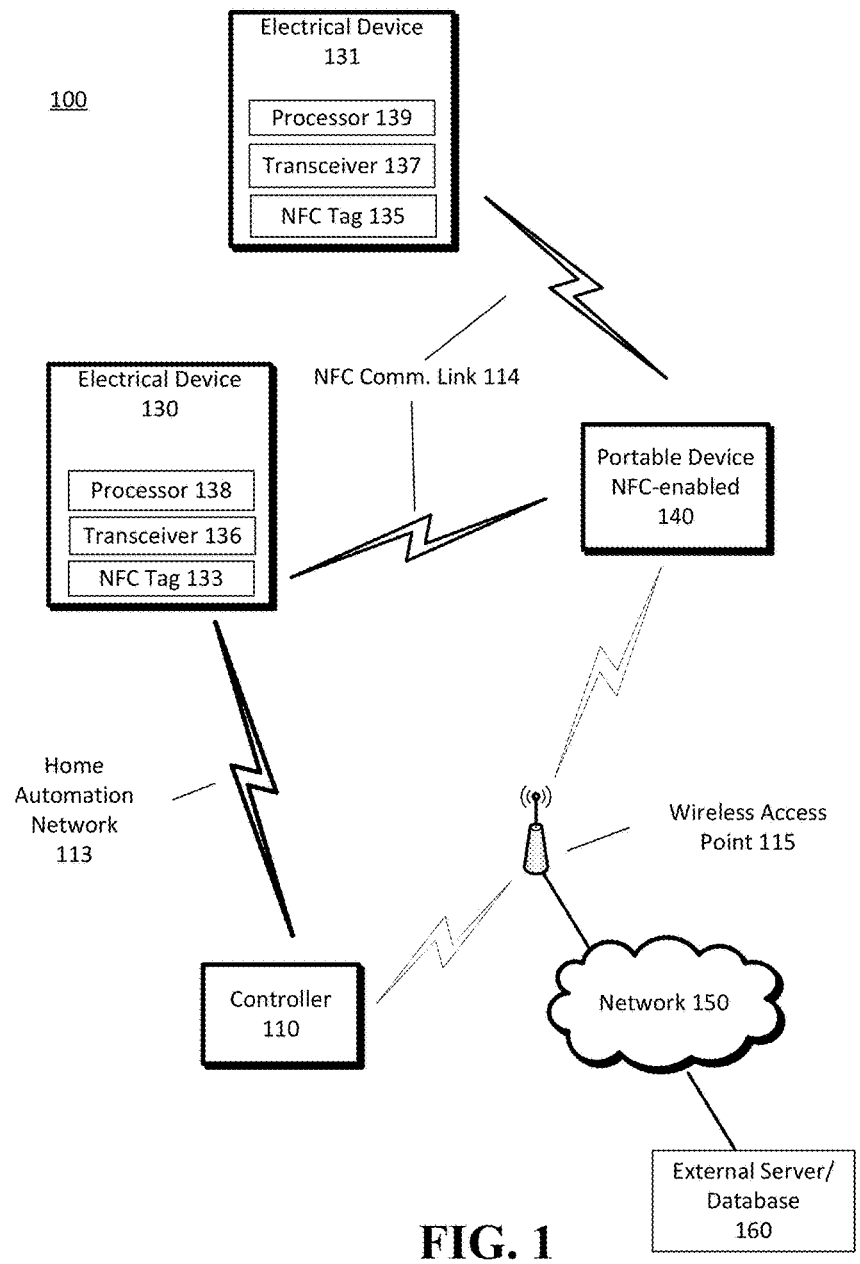
FIG. 1 shows a system according to an implementation of the disclosed subject matter.

FIG. 1 shows a system according to an implementation of the presently disclosed subject matter. The system 100 may include electrical devices 130 and 131, a controller 110, NFC-enabled portable device 140, wireless access point, 115, network 150, and external server/database 160. The electrical devices 130 and 131 may include processors 138, 139, transceivers 136, 137 and NFC tags 133 and 135, respectively. The electrical devices 130, 131 may be devices that are commissioned into the mesh network, or home automation network. The electrical devices 130 and 131 may be appliances, such as a microwave, oven, stove, coffee maker, refrigerator, washing machine, clothes dryer, a television, individual components of a gaming, an audio or entertainment system, control devices, such as wall switches or pushbuttons, for appliances or devices, such as a garage door opener control, weather stations, water/irrigation controls, and electric/electronic locks (garage, door, window, padlock), or the like. The terms "electrical device" and "appliance" may be used interchangeably in the description of the disclosed subject matter. The NFC tag 133 may include information related to the electrical device 130 or 131, such as a device identifier, model number, software version, firmware version, manufacture date, warranty information, and the like.

Each of the electrical devices 130 and 131 may communicate with a control device 110 through a home automation network 113. The controller 110 may include a processor, memory, transceiver and other components. The controller 110 may be a master controller in control of the entire mesh network. The controller 110 may store control parameters related to the respective electrical devices 130 and 131. The control parameters may indicate the control parameters of a specific device, the pairing of one device with other devices, as well as other features related to the control of the specific devices. Based on the control parameter settings, the control device may control the respective devices. For example, an electrical device 130 may be a wall-mounted switch that controls several other electrical devices that may be light fixtures. The controller may signal the light switches to turn ON when the wall-mounted switch is actuated.

The home automation network 113 may operate according to a mesh network protocol, such as the X10, Zigbee or similar mesh network protocol. Of course, the home automation network 113 may be a network of any type or typography, and is not limited to being a mesh network. In addition to controller 110, the home automation mesh network 113 may include intermediary control devices between the controller 110 and the electrical devices 130, 131. The controller 110 may also be an intermediary device that communicates with other controllers under control of a master controller. Alternatively, the electrical devices 130, 131 and controller 110 may communicate via Bluetooth. The controller 110 may be capable of accessing the wireless access point 115. The wireless access point 115 may be a router or similar device that communicates using Wi-Fi, Bluetooth or similar wireless communication protocol. The wireless access point 115 may provide a point of access for portable device 140 and controller 110 to access a network 150. The network 150 may be a LAN, WAN, the Internet or similar network. The network 150 may allow the controller and the portable device to upload and download information. The uploaded and downloaded information may be stored or processed by an external server/database 160.

The NFC-enabled portable device 140 may include an NFC tag reader that reads the respective NFC tags 133 and 135 through an NFC communication link 114. The NFC-enabled portable device 140 may be a mobile device, such as a cellular phone, a smartphone, a tablet computer, a netbook, a laptop or similar device that receives information from an NFC tag reader. The NFC tag reader may be integrated into the mobile device or may connect (wired or wirelessly) to the portable device.

Each of the electrical devices 130, 131 may be commissioned, or included, in the network 113. Commissioning into the network 113 may include addressing the electrical device 130, 131, generating control parameters based on user settings, and other data related to the electrical devices 130 and 131. Although the system 100 is shown with only two electrical devices 130, 131, multiple electrical devices may be commissioned into the home automation mesh network 113.

Figure 2:
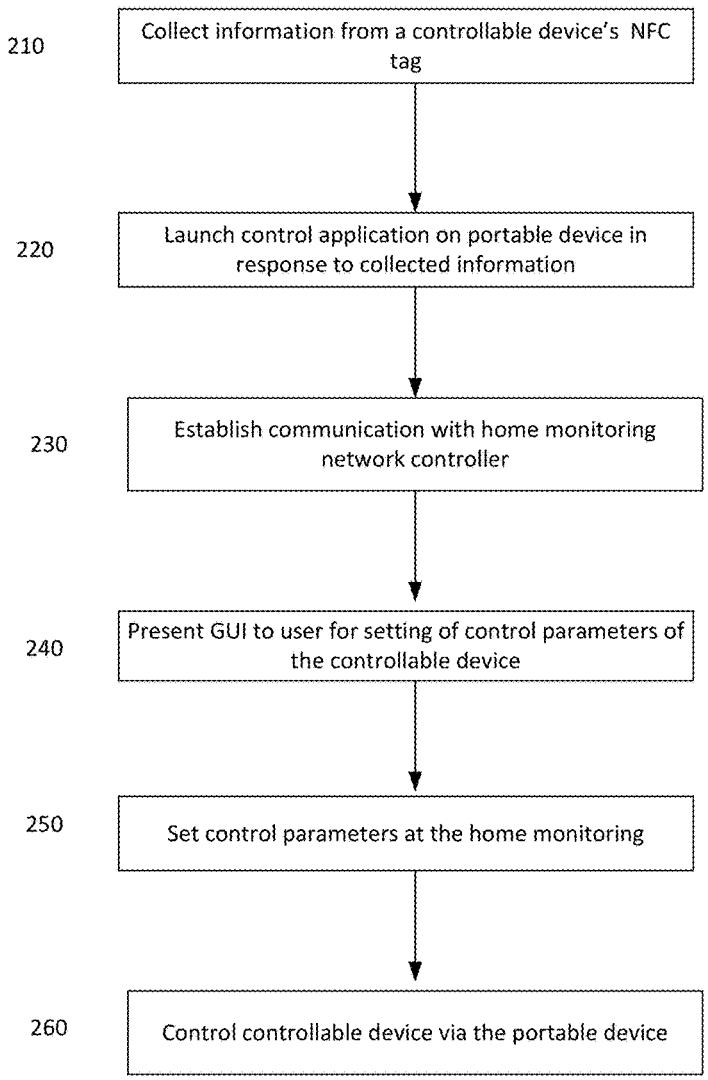
FIG. 2 shows a process flowchart according to an implementation of the disclosed subject matter.

A process 200 according to an implementation of the presently disclosed subject matter will described with reference to FIG. 2. Consider, for example, a mesh network in a home that may include a television, lights, automated window blinds and a wall switch control devices for the lights and blinds. A user, who is a visitor to the home, may wish to show other visitors videos stored on a memory device using an NFC-enabled television in the home owner's media room. Using an NFC-enabled portable device, such as device 140, the visitor may read the NFC tag associated with the television and collect information from the NFC tag (210). The television may be commissioned, or included, in a mesh network, and the television's NFC tag may indicate, for example, the model number, serial number, devices currently "paired" with the device. After collecting the information from the NFC tag, a control application may be launched on the portable device (220). The computer application executing on the portable device may establish a communication link through a wireless access point with a controller in the mesh network (230). The visitor, for example, may have been granted temporary access to the mesh network by the home owner, which allows the visitor's portable devices to connect to the mesh network and control or otherwise interface with other devices within the network. A graphical user interface (GUI) for the control application may be presented on a display of the portable device (240). The GUI may allow a user to input control commands for controlling the device identified by the read NFC tag and other intelligent devices commissioned in the mesh network. The GUI may present a number of control parameters (e.g., ON/OFF, dimmer, etc.) that can be set by the user through the launched application (250). Continuing with the example, the wall switches may also have NFC tags that are read by the visitor's portable device. The GUI may present control parameters for the other devices commissioned in the mesh network, mainly the lights and blinds. In addition, the GUI may allow the visitor to "pair" the television, lights and blinds to one another. By pairing the three devices together and depending on the control parameter settings selected by the visitor, the control of the each of the devices may be combined to respond to a single, or combination of, commands. Upon setting the control parameters, the portable device can be used to control the television via the communication channel (260). For example, a command to turn the television "ON" may cause the lights to dim and the blinds to close. Similarly, a command to turn the television "OFF" may cause the lights to brighten and the blinds to open. Any combination of devices commissioned in the home automation mesh network may be paired to allow cooperative operation of the paired devices. Of course, control of devices by the visitor is only allowed based on the home owner's permission settings in the home automation network. For example, the home owner may prevent a visitor from controlling certain devices, such as the door locks, security system, or home air conditioning settings.

The control of the commissioned devices may include pairing devices that are not at the time paired together or with other devices in the home automation network. In the above example, the television and room lighting control are paired together, but the home owner may not have the two paired in his home network settings. In addition, the settings by the visitor may be assigned a quick duration and a long duration. The quick duration may be settings that are maintained in memory for a short amount of time, such as thirty minutes or an hour. Meanwhile, long duration settings may be maintained in memory for several hours or days. Also, the home owner may be able to eliminate or change the visitor's settings at any time.

Figure 3:
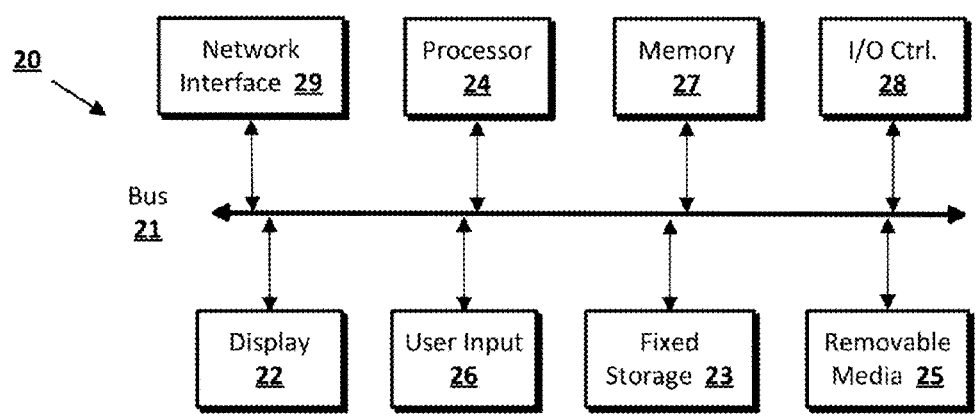
FIG. 3 shows computer configuration according to an implementation of the disclosed subject matter.

Implementations of the presently disclosed subject matter may be implemented in and used with a variety of component and network architectures. FIG. 3 is an example computer 20 suitable for implementing the presently disclosed subject matter. For example, the electrical devices, portable device and the mesh network controller or intermediary devices may implemented in a similar fashion as computer 20. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 1.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   collecting information from a radio frequency readable tag of a first electrical device using a radio frequency tag reader in a portable device;
   collecting information by reading a radio frequency readable tag of a second electrical device;
   launching a control application on the portable device in response to the collected information;
   presenting a graphical user interface on the portable device display;
   establishing by the portable device communication with a controller in a mesh network, wherein the portable device has temporary permission to connect to the network;
   pairing the first electrical device with the second electrical device, wherein the paired first and second electrical devices operate in cooperation;
   setting control parameters for the first electrical device and the second electrical device in response to inputs to the graphical user interface; and
   transmitting control signals for controlling the first electrical device and the second electrical device based on the control parameters settings and control inputs received from the user interface presented on the portable device.

2. The method of claim 1, wherein the graphical user interface presents control parameters in a quick setting menu and a long setting menu.

3. The method of claim 2, wherein the control parameter settings made in the quick setting menu are set of a duration that is less than the duration of the control parameter settings made in the long setting menu.

4. The method of claim 1, wherein the first electrical device and the second electrical device were not previously paired to one another in a network including the first electrical device and the second electrical device.

5. The method of claim 1, wherein the temporary permission allows the portable device to set the control parameters for a quick duration.

6. A method comprising:
   collecting information from a radio frequency readable tag of a first electrical device using a radio frequency tag reader in a portable device;
   launching a control application on the portable device in response to the collected information;
   presenting a graphical user interface on the portable device display;
   setting control parameters for the first electrical device in response to inputs to the graphical user interface;
   receiving second data from a near field communication tag associated with a second electrical device, the second data providing information related to the second electrical device;
   setting functions that pair the first electrical device to the second electrical device to allow cooperative operation of the paired first and second electrical devices;
   in response to an input to the graphical user interface, selecting at least one control parameter from a plurality of control parameters presented in the graphical user interface for controlling the paired first electrical device and the second electrical device; and
   in response to a control signal generated by the portable device and intended to control a first operation related to the first electrical device, transmitting control signals to the first electrical device to perform the first operation and to the second electrical device to perform a second operation that is different from the first operation and based on the selected control parameter.

7. The method of claim 6, further comprising:
establishing communication with a controller in a mesh network.

8. The method of claim 6, further comprising:
transmitting control signals based on the control parameter settings to the controller in the mesh network.

9. The method of claim 8 further comprising:
receiving a notification at the conclusion of an event related to either the first or second device.

10. The method of claim 9, wherein an event is at least one of a time of day, a date, and a response to an operation performed by another device.

11. The method of claim 6, further comprising:
sending control signals to the controller in the home mesh network to instruct the first electrical device to perform a function based on the control parameter settings.

12. The method of claim 6, wherein the controller is a device within the home mesh network that controls electrical devices in the mesh network.

13. The method of claim 6 further comprising:
generating a group of paired devices based on the first and second data, wherein the group of paired devices includes at least the first electrical device and the second electrical device.

14. The method of claim 13, wherein the generated group includes identified devices that are controllable as a group for a predetermined time period.

15. The method of claim 13, wherein the generated group includes identified devices that are controllable as a group whenever the portable device is recognized by a home control network.

16. The method of claim 13, wherein the generated group includes devices related to the identified devices, and whose NFC tags have not been read.

17. The method of claim 6, wherein control of the first electrical device and the second electrical devices is based on permission settings in a network including the first electrical device and the second electrical device.

18. A device, comprising:
a memory;
a near field communication tag reader;
a display device;
a transceiver communicatively coupled to a network; and
a processor configured to:
collect information from a radio frequency readable tag of a first electrical device from near field communication tag reader;
collecting information by reading a radio frequency readable tag of a second electrical device;
launch a control application in response to the collected information;
present a graphical user interface for inputting signals to the control application on the display device;
establishing by the portable device communication with a controller in a mesh network, wherein the portable device has temporary permission to connect to the network;
pairing the first electrical device with the second electrical device, wherein the paired electrical devices operate in cooperation; and
in response to inputs to a quick setting menu of the graphical user interface presented on the display device, set control parameters for the first electrical device, wherein the control parameter are set for a short time duration.

19. The device of claim 18, wherein the processor is configured to set control parameters by:
selecting, in the graphical user interface, at least one control parameter from a plurality of control parameters presented in the graphical user interface for controlling the first electrical device;
receiving second data from a radio frequency readable tag associated with a second electrical device, the second data providing information related to the second electrical device; and
setting functions that pair the first electrical device to the second electrical device.

20. The device of claim 18, wherein the first electrical device is an appliance or product with an NFC tag.

21. The device of claim 18, wherein the processor is further configured to:
generate control signals for controlling the first electrical device based on the control parameters settings.

* * * * *